Aug. 22, 1944.   J. F. STOCKDALE   2,356,284
PHOTOGRAPHIC ROLL FILM ADAPTER FOR PLATE AND FILM PACK CAMERAS
Filed June 5, 1941   2 Sheets-Sheet 1

J. F. Stockdale
INVENTOR.

BY

Aug. 22, 1944.  J. F. STOCKDALE  2,356,284
PHOTOGRAPHIC ROLL FILM ADAPTER FOR PLATE AND FILM PACK CAMERAS
Filed June 5, 1941  2 Sheets-Sheet 2
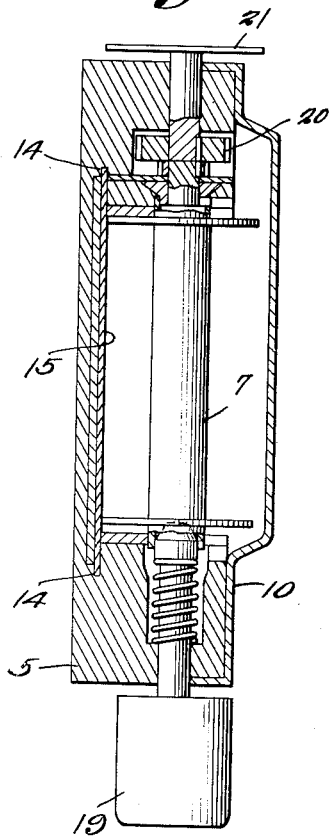
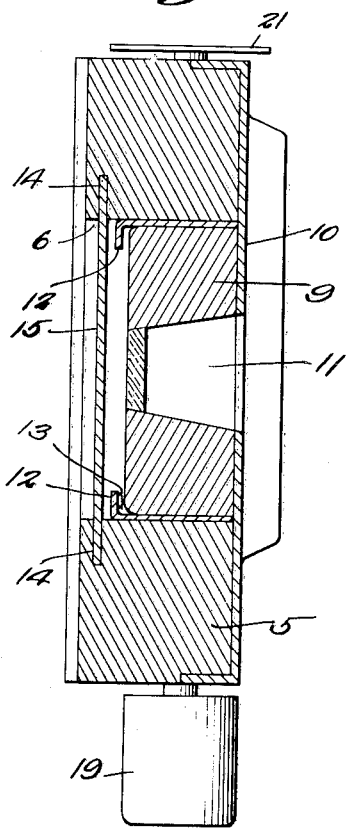
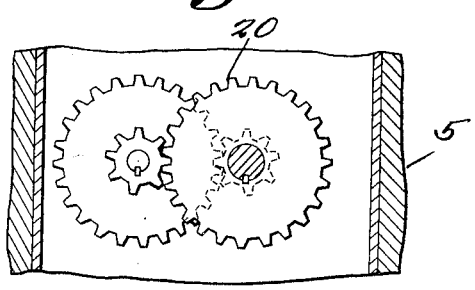
J. F. Stockdale
INVENTOR.

Patented Aug. 22, 1944

2,356,284

UNITED STATES PATENT OFFICE 2,356,284

PHOTOGRAPHIC ROLL FILM ADAPTER FOR PLATE AND FILM PACK CAMERAS

James F. Stockdale, Sandusky, Ohio

Application June 5, 1941, Serial No. 396,780

1 Claim. (Cl. 95—31)

This invention relates to a roll film adapter for use in conjunction with camers of the plate or film pack type, the primary object of the invention being to provide a device of this character which may be readily positioned and will not require adjustment to suit the camera.

A further object of the invention is to provide a simple and inexpensive device whereby the scope of the camera of this type will be broadened to more universal proportions, notably by utilizing small size roll film in sizes suitable for color or black and white reproduction or projection purposes, as provided by projectors designed to accept 2" x 2" slides.

A still further object of the invention is to provide a device of this character which may be readily and easily positioned in a plate or film pack camera in lieu of the usual plate holder or film fastener, converting the camera for use with photographic roll film.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing of the spirit of the invention.

Referring to the drawings:

Figure 3 is a sectional view taken on line 3—3 of Figure 2.

Figure 4 is a sectional view taken on line 4—4 of Figure 2.

Figure 5 is a sectional view taken on line 5—5 of Figure 1.

Figure 1:
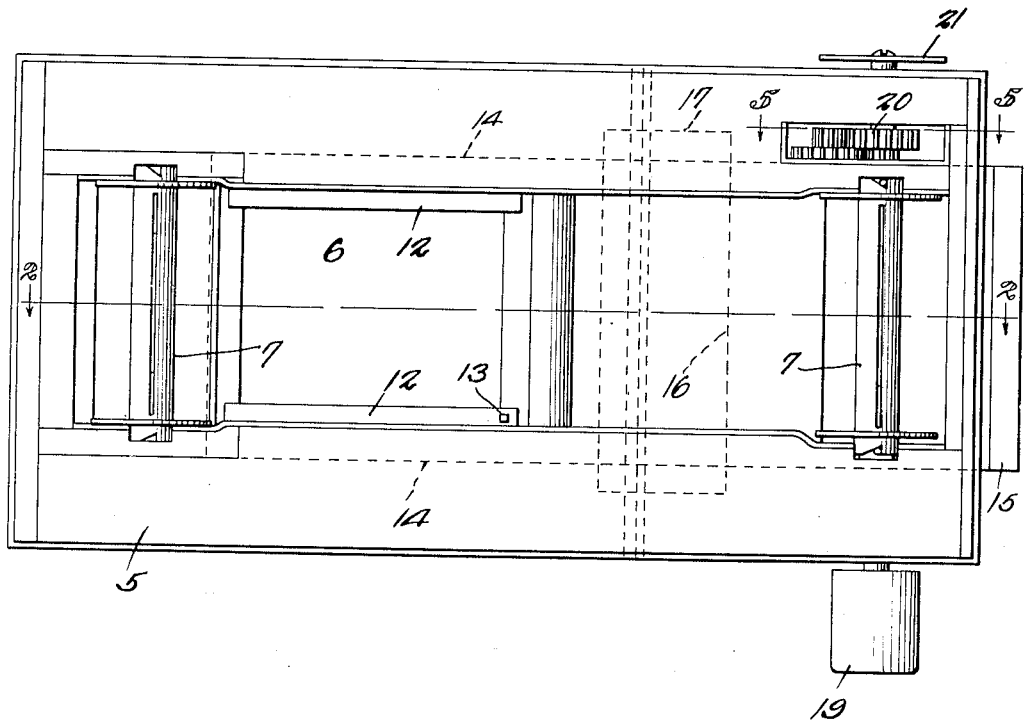
Figure 1 is an elevational view of the adapter, the cover thereof having been removed.

Referring to the drawings in detail, the adapter comprises a body portion indicated generally by the reference character 5, the body portion having an exposure opening 6.

At each end of the body portion is a spool cavity, in which the spools 7 on which the film 8 is wound, are mounted.

A table indicated at 9 is secured to the cover plate 10, and is arranged on the cover plate, so that it will lie directly to the rear of the exposure opening 6. The table 9 is formed with a sight opening 11, through which the rear of the film may be viewed, so that the operator may determine when a film has been properly centered for the exposure.

As shown, the film moves over the table 9, and is held into engagement with the table 9, by means of the flanges 12, which are arranged in parallel spaced relation with the top of the table 9. A lug indicated at 13 is formed on one of the flanges 12, and is adapted to move into perforations formed at the edge of the film, to hold the film centered with respect to the exposure opening. By exerting pressure on the roll on which the film is being wound, the film will be drawn from the lug, allowing the film to be wound from one spool to the other.

Grooves are formed in the front wall 14 of the body portion and accommodate the edges of the slide 15 which closes the exposure opening of the body portion, and seals the opening against light entering the body portion to cloud the film.

Figure 2:
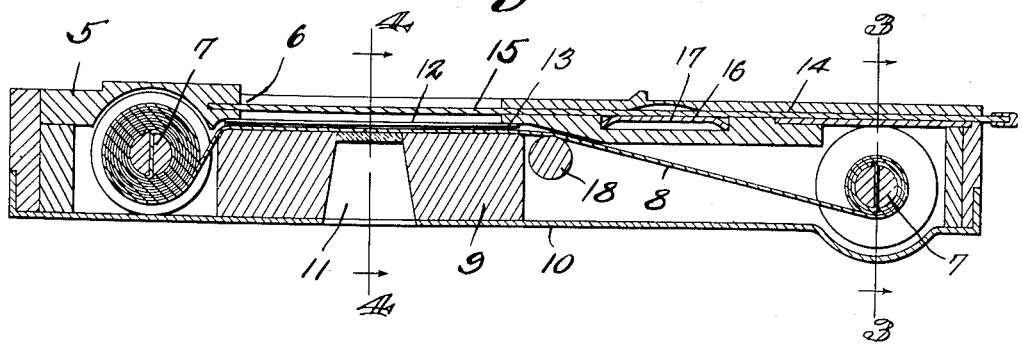
Figure 2 is a sectional view taken on line 2—2 of Figure 1.

The upper wall of the body portion is formed with a wide cut-out portion 16 in which the spring member 17 is mounted, the spring having its side edges bearing against the side walls of the cut-out portion, as clearly shown by Figure 2 of the drawings. Directly above the cut-out portion 16, is a curved recess into which the spring member 17 extends, due to its resiliency, when the slide 15 is removed. Thus it will be seen that because of this construction, the opening into which the slide 15 moves, will be closed against light entering at this point.

A roller indicated at 18 is mounted within the body portion and provides a support for the film to hold the film in its proper position, while it is being moved from one spool to the other.

The spool on which the film is being rolled, is operated by means of the fingerpiece 19, which spool is connected with the gearing indicated at 20 that in turn operates the indicator 21 which indicates the number of exposures made, so that the operator may tell at a glance, whether the film has been properly moved to expose a picture section.

In the use of the adapter, the usual plate holder or film pack is removed from the camera, and the device forming the subject matter of this invention, is positioned in lieu thereof. When the adapter has been properly positioned, the slide 15 is removed, whereupon the film is moved to a position to align with the exposure opening of the camera to take a picture.

Should it be desired to remove the adapter prior to the taking of all the pictures on the roll, it is only necessary to replace the slide 15, which closes the exposure opening 6 of the adapter, and seals the adapter against light.

Due to the construction shown and described, it will be seen that I have provided an adapter which may be readily carried and positioned in the usual plate or film pack camera adapting the camera for use in taking pictures on a roll of film.

What is claimed is:

A roll film adapter for positioning in a film pack camera, comprising a body having an exposure opening, a cover for the body, a table secured to the cover and having an opening adapted to register with the exposure opening, and over which a film strip moves, said table extending to a point in proximity to the front wall of the body, spaced flanges disposed in spaced relation with the table and extending inwardly over the upper surface of the table, means for supporting a spool on which a film is wound, adjacent to one end of the table, means for supporting a spool within the body, adjacent to one end of the body and from which the film is unwound, a lug on one of said flanges adapted to extend into an opening of said film strip restricting movement of the film strip, and a film guide roller disposed between the latter spool and one edge of said table, and over which the film is guided to the table.

JAMES F. STOCKDALE.